United States Patent
Woo et al.

(10) Patent No.: US 12,272,126 B2
(45) Date of Patent: Apr. 8, 2025

(54) REINFORCEMENT LEARNING-BASED SENSOR DATA MANAGEMENT METHOD AND SYSTEM

(71) Applicant: RESEARCH & BUSINESS FOUNDATION SUNGKYUNKWAN UNIVERSITY, Suwon-si (KR)

(72) Inventors: Hong Uk Woo, Suwon-si (KR); Seung Hwan Jeong, Suwon-si (KR); Gwang Pyo Yoo, Suwon-si (KR); Min Jong Yoo, Suwon-si (KR); Ik Jun Yeom, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 999 days.

(21) Appl. No.: 17/135,843

(22) Filed: Dec. 28, 2020

(65) Prior Publication Data

US 2021/0201084 A1     Jul. 1, 2021

(30) Foreign Application Priority Data

Dec. 26, 2019     (KR) .......................... 10-2019-0175671

(51) Int. Cl.
  *G06V 10/82*     (2022.01)
  *G06F 18/21*     (2023.01)
  (Continued)

(52) U.S. Cl.
  CPC ............ *G06V 10/82* (2022.01); *G06F 18/217* (2023.01); *G06F 18/2413* (2023.01);
  (Continued)

(58) Field of Classification Search
  None
  See application file for complete search history.

(56) References Cited

U.S. PATENT DOCUMENTS 10,809,388 B1 * 10/2020 Carcanague .......... G01S 19/252
11,710,303 B2 *  7/2023 Haynes ........... B60W 60/00276
                                                      701/23

(Continued)

FOREIGN PATENT DOCUMENTS

KR       10-1030345 B1      4/2011
KR    10-2017-0056879 A     5/2017
KR    10-2019-0030897 A     3/2019

OTHER PUBLICATIONS

Li, et al., "Virtual Fog: A Virtualization Enabled Fog computing Framework for Internet of Things", *IEEE Internet of Things Journal*, Nov. 2017.

(Continued)

*Primary Examiner* — Haimei Jiang
(74) *Attorney, Agent, or Firm* — NSIP Law (57) ABSTRACT

A reinforcement learning-based sensor data management system includes a processor configured to: manage virtualized objects that correspond to sensors included in a sensor network to update data received from each sensor and queries representing a data quality requested by an application; calculate an abstracted action that abstracts a size of an action space of the sensor network based on present state information of the virtualized objects and the queries; calculate scores for virtualized objects based on position relationships between the calculated abstracted action the virtualized objects; and assign priorities to the virtualized objects based on the calculated scores to update data received from the sensors to the virtualized objects according to the priorities.

10 Claims, 7 Drawing Sheets

(51) Int. Cl.
  *G06F 18/2413* (2023.01)
  *G06F 18/25* (2023.01)
  *G06V 10/764* (2022.01)
  *G06V 10/776* (2022.01)
  *G06V 10/80* (2022.01)

(52) U.S. Cl.
  CPC .......... *G06F 18/251* (2023.01); *G06V 10/764* (2022.01); *G06V 10/776* (2022.01); *G06V 10/803* (2022.01)

(56) References Cited

U.S. PATENT DOCUMENTS

| | | | | |
|---|---|---|---|---|
| 2008/0263196 | A1* | 10/2008 | Kansal | H04L 67/12 709/224 |
| 2015/0029218 | A1* | 1/2015 | Williams | G02B 27/0172 345/633 |
| 2020/0169762 | A1* | 5/2020 | Goluguri | H04N 21/47202 |
| 2020/0326704 | A1* | 10/2020 | Blanco | G05D 1/0088 |
| 2021/0382488 | A1* | 12/2021 | Haynes | G06N 20/00 |

OTHER PUBLICATIONS

Korean Office Action issued on Dec. 14, 2020 in corresponding Korean Patent Application No. 10-2019-0175671. (2 pages in Korean).

\* cited by examiner

FIG. 1A

(Conventional)

FIG. 1B

(Conventional)

FIG. 1C

(Conventional)

| $O_{1,1}$ | $O_{1,2}$ | $O_{1,3}$ | $O_{1,4}$ | $O_{1,5}$ |
|---|---|---|---|---|
| $O_{2,1}$ | $O_{2,2}$ | | | |
| $O_{3,1}$ | $O_{3,2}$ | | | |
| $O_{4,1}$ | | | | |
| $O_{5,1}$ | | | | |

FIG. 6

| | | | | |
|---|---|---|---|---|
| | $u_1$ | | $u_2$ | |
| | | | | |
| | $u_3$ | | $u_4$ | |
| | | | | |

FIG. 7

```
Algorithm 1: State manager process
 1  oset, qset, ctx ← initialize()                              // initialize the system state
 2  while not done do
 3      finishedJobs ← Orchestrator.execute(oset, qset, ctx)    // (1)-(5) in FIG. 3
 4      for i, j ∈ [1,...,MaxScale_x] × [1,...,MaxScale_y] do   // (6) in FIG. 3
 5          o_{i,j}.s ← max(o_{i,j}.s + 1, MaxState)
 6      for w ∈ finishedJobs do
 7          o_{w.index}.s ← 0, o_{w.index}.value ← w.value      // apply the result of job w
 8      qset.add(Application.getNewQuery())
 9      reward ← 0
10      for q ∈ qset do
11          satisfy ← True
12          for i, j ∈ [1,...,MaxScale_x] × [1,...,MaxScale_y] do
13              if q.b_{i,j} > o_{i,j}.s then
14                  satisfy ← False
15          if satisfy then
16              reward ← reward + Δ, qset.remove(q)
17          else
18              q.d ← q.d - 1
19              if q.d < 0 then
20                  reward ← reward - Δ, qset.remove(q)
21      ctx ← generateNewContext(qset)
22      evaluateQuery(qset, oset)                               // (7) in FIG. 3
23      feedback(reward)
```

REINFORCEMENT LEARNING-BASED SENSOR DATA MANAGEMENT METHOD AND SYSTEM

CROSS-REFERENCE TO RELATED APPLICATIONS

This application claims the benefit under 35 U.S.C. § 119(a) of Korean Patent Application No. 10-2019-0175671 filed on Dec. 26, 2019, in the Korean Intellectual Property Office, the entire disclosure of which is incorporated herein by reference for all purposes.

BACKGROUND

1. Field

The following description relates to a sensor data management technique, for example, a reinforcement learning-based sensor data management method and system that schedule to update sensors using deep learning-based reinforcement learning to efficiently manage sensor data, even under various resource constraints.

Description of Related Art

Hyper connection through the development of the modern Internet of Things technology has enabled the realization of digital twin, which means the integration of the physical world and the digital world. The digital twin aims for smooth synchronization of physical sensor data and digital data by abstracting and digitizing the physical world.

However, it is difficult to satisfy a data quality required at an application level in an environment in which resources for synchronization between a physical object and digital data are limited. According to a result of a simulation using an autonomous driving application, it was observed that the longer the limitation of resources used for updating, an updating cycle (a sensor sampling cycle), or an update delay time (a network delay time), the worse the performance.

Figure 1A:
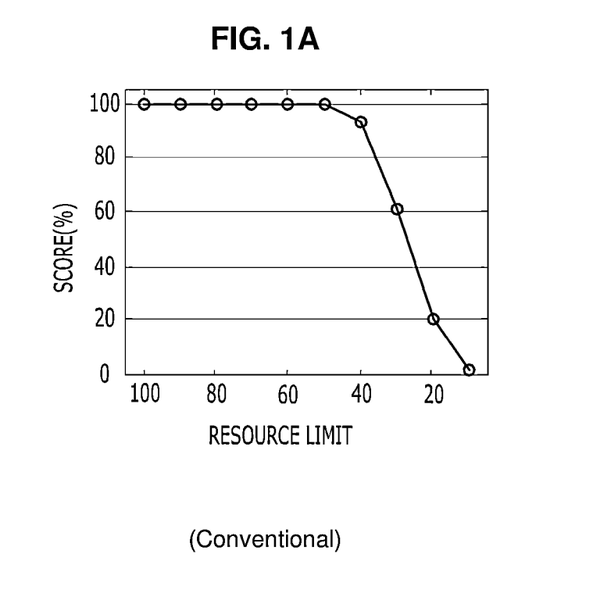
FIGS. 1A to 1C are views illustrating influence of a limited system resource in an example test using a driving simulator.
Figure 1B:
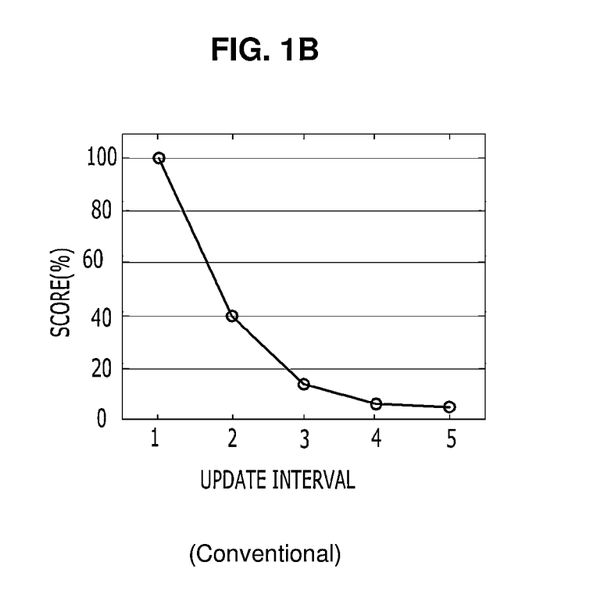
Figure 1C:
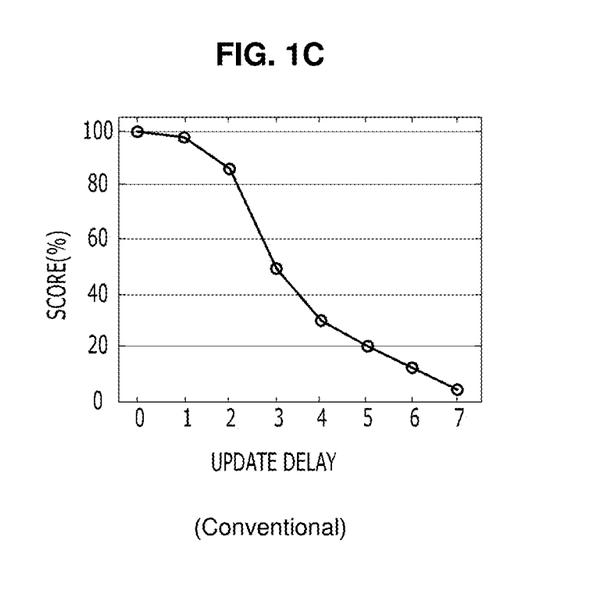

FIGS. 1A to 1C illustrate influence of a limited system resource in an example test using a driving simulator. In FIGS. 1A to 1C, a driving score on a Y-axis represents a driving ability of a tested agent. It is understood that as more resource limit conditions for a sensing mechanism are specified, the score is lowered. On an X-axis, a limit level applied to usage of the resource based on configurable parameters, such as a resource limit ratio (FIG. 1A), an update time interval of a frame (FIG. 1B), and an update delay of a frame (FIG. 10), is set in a plurality of composite stages. For example, the resource limit emulates the processing of a network system with a limited bandwidth availability for data transmission and a multiple narrow viewing angle sensor or a multiple camera detecting system to specify some of newly updated parts of a scene image. Similarly, the update time interval and the update delay create various situations of emulating a time limit and incomplete data synchronization. As expected, it is understood that the greater the limits, the significantly lower the driving score level.

Further, the deep learning-based reinforcement learning of the related art has a problem in that the larger an action space, the deeper the difficulty in learning. In the case of a normal data management system, the number of cases of actions which can be selected according to the number of sensor data is rapidly increasing. For example, the number of cases of actions of updating 20% of sensors of 256 sensors is $$\left\{ \binom{256}{51} \approx 1 \times 10^{25} \right\}.$$

Due to this problem, when the data management is performed by applying the existing reinforcement learning, the number of sensors used in the simulation is less than a dozen, so that it is difficult to apply to an actual environment where many sensors are provided.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect reinforcement learning-based sensor data management system includes a processor configured to: manage virtualized objects that correspond to sensors included in a sensor network to update data received from each sensor and queries representing a data quality requested by an application; calculate an abstracted action that abstracts a size of an action space of the sensor network based on present state information of the virtualized objects and the queries; calculate scores for virtualized objects based on position relationships between the calculated abstracted action the virtualized objects; and assign priorities to the virtualized objects based on the calculated scores to update data received from the sensors to the virtualized objects according to the priorities.

The present state information may include aging degrees indicating time intervals between a times at which the virtualized objects are most recently updated and a present time, update execution times indicating times required to update the virtualized objects after determining to update the virtualized objects, and remaining execution times indicating times remaining until updates of the virtualized object are completed. The queries may include aging degree upper limits and deadlines for the virtualized objects.

The processor may include: a virtual object layer configured to manage the virtual objects; and a data orchestrator configured to calculate the abstracted action, calculate the scores for virtualized objects, and assign the priorities to the virtualized objects.

The data orchestrator may be further configured to calculate the abstracted action having an action space smaller than an action space of the sensor network, based on a policy that is set in advance with the aging degrees of the virtualized objects, the update execution times, the remaining execution times, the queries, and contexts as inputs.

The data orchestrator may be further configured to calculate the scores for the virtualized object based on distances between the abstracted action and the virtualized objects.

The processor may be further configured to: transmit a positive value as a reward, in response to the queries being satisfied; and transmit a negative value as the reward, in response to the queries being violated.

In another general aspect, a processor-implemented reinforcement learning-based sensor data management method includes: preparing, by a reinforcement learning-based sensor data management system, virtualized objects that correspond to sensors included in a sensor network to update data received from each of the sensors and queries representing a data quality requested by an application; calculating, by the reinforcement learning-based sensor data management system, an abstracted action that abstracts a size of an action space of the sensor network based on present state information of the virtualized objects and the queries; calculating, by the reinforcement learning-based sensor data management system, scores for the virtualized objects based on position relationships between the calculated abstracted action and the virtualized objects; and assigning, by the reinforcement learning-based sensor data management system, priorities to the virtualized objects based on the calculated scores to update data received from the sensors to the virtualized objects according to the priorities.

The present state information of the virtualized objects may include aging degrees indicating time intervals between times at which the virtualized objects are most recently updated and a present time, update execution times indicating times required to update the virtualized objects after determining to update the virtualized objects, and remaining execution times indicating times remaining until updates of the virtualized objects are completed. The queries may include aging degree upper limits and a deadlines for the virtualized objects.

In the calculating of the abstracted action, the reinforcement learning-based sensor data management system may calculate the abstracted action having an action space smaller than an action space of the sensor network, based on a policy that is set in advance with the aging degrees of the virtualized objects, the update execution times, the remaining execution times, the queries, and contexts as inputs.

In the calculating of the scores, the reinforcement learning-based sensor data management system may calculate scores for the virtualized objects based on distances between the abstracted action and the virtualized objects.

The method may further include: transmitting, by the reinforcement learning-based sensor data management system, a positive value as a reward in response to the queries being satisfied; and transmitting, by the reinforcement learning-based sensor data management system, a negative value as the reward in response to the queries being violated.

In another general aspect, a non-transitory computer-readable storage medium stores instructions that, when executed by a processor, cause the processor to perform the method described above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed, as will be apparent after gaining an understanding of this disclosure, with the exception of operations necessarily occurring in a certain order. Also, descriptions of features known in the art may be omitted for increased clarity and conciseness.

The features described herein may be embodied in different forms, and are not to be construed as being limited to the examples described herein. Rather, the examples described herein have merely been provided to illustrate some of the many possible ways of implementing the methods, apparatuses, and/or systems described herein that will be apparent after an understanding of this disclosure. Hereinafter, while embodiments of the present disclosure will be described in detail with reference to the accompanying drawings, it is noted that examples are not limited to the same.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

Figure 2:
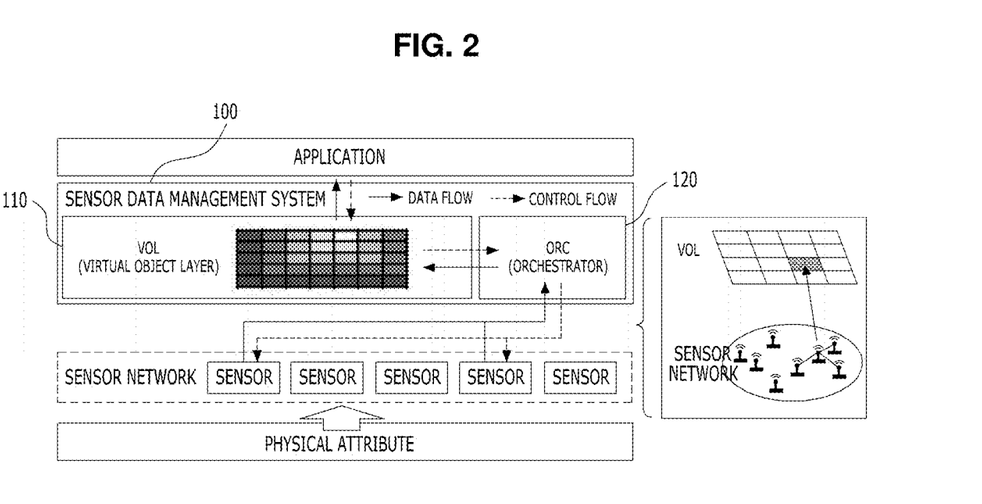
FIG. 2 is a block diagram illustrating a schematic configuration of a reinforcement learning-based sensor data management system, according to an embodiment.

FIG. 2 is a block diagram illustrating a schematic configuration of a reinforcement learning-based sensor data management system, according to an embodiment.

Referring to FIG. 2, the reinforcement learning-based sensor data management system 100 may include, for example, a virtual object layer (VOL) 110 and a data orchestrator (ORC) 120.

The virtual object layer 110 provides a materialized view obtained by abstracting a physical environment as an object to an application layer. That is, the virtual object layer 110 performs a function of managing a plurality of virtualized objects, which is continuously updated and queries representing a data quality requested by applications.

The virtualized object may be represented by three metadata including an aging degree (o.s), an update execution time (o.p), and a remaining execution time (o.r). The aging degree is a time interval between a time at which the virtualized object is most recently updated and the present time. The update execution time is a time required to update the virtualized object after determining to update the corresponding virtualized object. The remaining execution time is a time remaining until the update of the virtualized object is completed.

The query may be represented by an aging degree upper limit (q.b) and a deadline (q.d) for each virtualized object.

The data orchestrator 120 schedules to update the sensor data using deep learning-based reinforcement learning by identifying a present state of the plurality of virtualized objects and a query of the application to perform resource-efficient data management.

Specifically, the data orchestrator 120 receives present state information of the plurality of virtualized objects and queries of the application from the virtual object layer 110 to calculate an abstracted action that abstracts a size of an action space of a sensor network and calculate scores of the plurality of virtualized objects based on a position relationship between the calculated abstracted action and each virtualized object, and assign scores for the plurality of virtualized objects based on the calculated scores to update data received from each sensor according to a priority to the plurality of virtualized objects.

By performing the foregoing operations, the reinforcement learning-based sensor data management system 100 relieves a large discrete action space problem to effectively use soft actor critic (SAC) and proximal policy optimization (PPO), which are reinforcement learning algorithms for continuous spaces of the related art.

Figure 3:
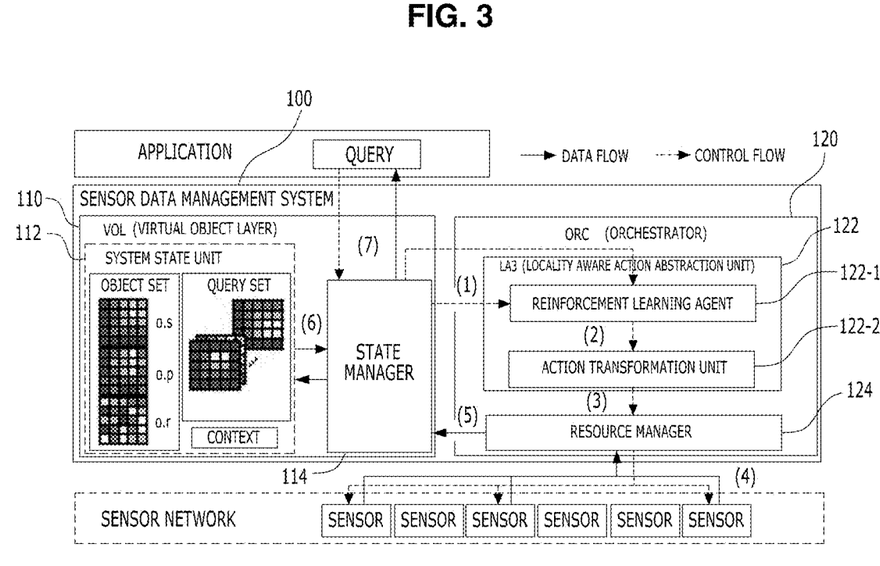
FIG. 3 is a block diagram explaining a detailed configuration and an operating principle of the reinforcement learning-based sensor data management system, according to an embodiment.

FIG. 3 is a block diagram explaining a detailed configuration and an operating principle of the reinforcement learning-based sensor data management system 100, according to an exemplary embodiment of the present disclosure.

Referring to FIG. 3, the virtual object layer 110 may include, for example, a system state unit 112 and a state manager 114.

The system state unit 112 stores an object set, a query set, and contexts. The object set includes an aging degree (o.s), an update execution time (o.p), and a remaining execution time (o.r) as present state information of each virtualized object as well as the plurality of virtualized objects. The query set includes an aging degree upper limit (q.b) and a deadline (q.d) for each virtualized object.

The state manager 114 updates data received from a plurality of sensors included in the sensor network to the virtualized object corresponding to each sensor. In this case, the state manager 114 updates the plurality of virtualized objects according to a priority set by a resource manager 124 of the data orchestrator 120 to be described below.

Further, the state manager 114 may store queries received from the application at every time step.

Further, when the query requested by the application is satisfied, the state manager 114 transmits a positive value as a reward of a reinforcement learning agent 122-1 of the data orchestrator 120 to be described below and, when the query is violated, transmits a negative value as a reward of the reinforcement learning agent 122-1. For example, when the aging degrees of all virtualized objects are lower than an aging degree upper limit of the corresponding query and the deadline of the query does not end, the state manager 114 determines that the corresponding query is satisfied. In contrast, when the deadline of the query has elapsed, the state manager 114 determines that the corresponding query is violated.

The data orchestrator 120 generally includes a locality aware action abstraction unit (LA3) 122 and a resource manager 124.

The locality aware action abstraction unit 122 receives present state information of each virtualized object and query requested by the application from the virtual object layer 110 to learn a policy of selecting objects to be updated. To this end, the locality aware action abstraction unit 122 may include a reinforcement learning agent 122-1 and an action transformation unit (or action transformer) 122-2.

The reinforcement learning agent 122-1 calculates an abstracted action having an action space smaller than an action space of the sensor network based on a policy which is set in advance with an aging degree of each virtualized object, an update execution time, a remaining execution time, queries of the application, and contexts as inputs.

The action transformation unit 122-2 calculates scores for the plurality of virtualized objects based on a position relationship between the abstracted action calculated by the reinforcement learning agent 122-1 and each virtualized object, for example, based on a distance. The abstracted action calculating method of the reinforcement learning agent 122-1 and the score calculating method of the action transformation unit 122-2 will be described below in more detail with reference to FIG. 4.

The resource manager 124 assigns priorities to the plurality of virtualized objects based on the scores for the virtualized objects calculated in the action transformation unit 122-2 and transmits data received from each sensor to the state manager 114 according to the priority.

Figure 4:
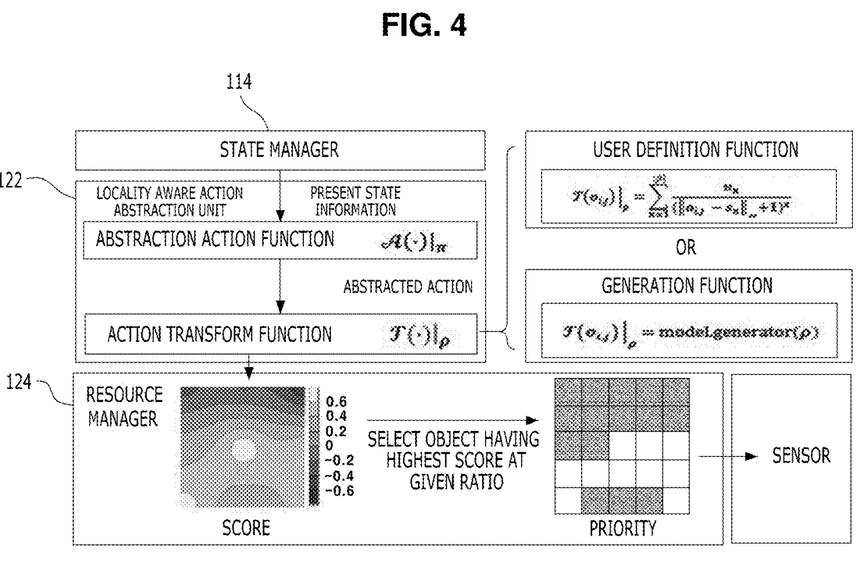
FIG. 4 is a view explaining a calculating method of an abstracted action and a score calculating method of a locality aware action abstraction unit, according to an embodiment.

FIG. 4 is a view explaining a calculating method of an abstracted action and a score calculating method of a locality aware action abstraction unit, according to an embodiment.

Referring to FIG. 4, the reinforcement learning agent 122-1 calculates an abstracted action using an abstraction action function defined by the following Equation 1.

$$(a)\ \mathcal{A}(\bullet)|\pi \mapsto \rho, (b)\ \{\mathcal{T}(\bullet)|\rho\}_{\forall o \in oset} \mapsto N\text{-scores} \mapsto \text{Top-}k\ \text{ranking}. \quad \text{Equation 1}$$

In Equation 1, the function $A(\bullet)|$ refers to reinforcement learning. The reinforcement learning agent 122-1 uses the aging degree, the update execution time, the remaining execution time, present queries, and contexts as inputs of the abstraction action function. The reinforcement learning agent 122-1 applies a predetermined policy $\pi$ to the above-mentioned inputs to calculate an abstracted action $\rho$ having an action space smaller than an action space of the sensor network. The abstracted action $\rho$ is a parameter set consisting of $u_1, u_2, u_3,$ and ... such as: $\rho=[u_1, u_2, \ldots, u_{|\rho|}] \in \mathbb{R}^{|\rho|}$, and maps to a specific position of a space VOL, respectively.

The action transformation unit 122-2 creates an action transform function $T(\bullet)|\rho$ using the abstracted action $\rho$ previously calculated by the reinforcement learning agent 122-1 and evaluates a score of each virtualized object ($o_{i,j}$) using the abstracted action $\rho$. The action transform function is defined by the following Equation 2.

$$\mathcal{T}(o_{i,j})|\rho := \sum_{n=1}^{|\rho|} \frac{u_n}{(\|o_{i,j} - s_n\|_\infty + 1)^K} \text{ where } K \in \mathbb{R}^+ \quad \text{Equation 2}$$

In Equation 2, $s_n$ is a position of $\rho n$ and $o_{i,j}-s_n$ represents a distance between the position of the abstracted action $\rho$ and the object $o_{i,j}$.

Figure 5:
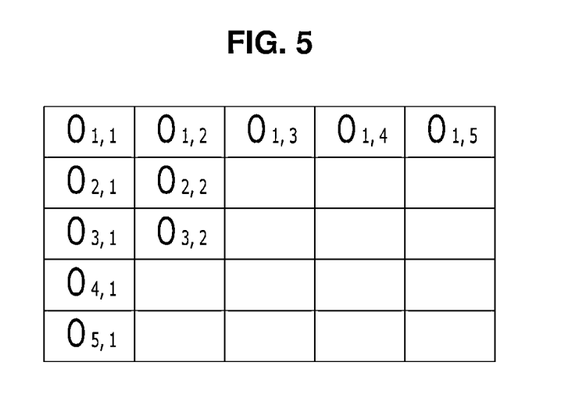
FIG. 5 is a view illustrating an arrangement example of a virtualized object.

For example, when VOL is 5×5 (N=25) and $|\rho|$ is 4, the virtualized objects may be represented as illustrated in FIG. 5.

Referring to FIG. 5, $O_{2,3}$ refers to a virtualized object in a second row and a third column and the abstracted action $\rho$ is a set formed by $[u_1, u_2, u_3, u_4]$.

Figure 6:
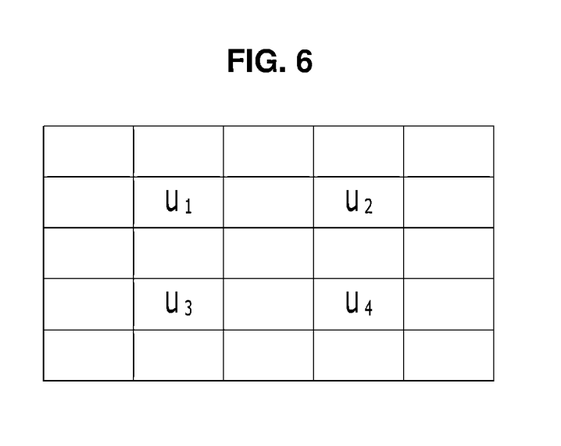
FIG. 6 is a view illustrating an arrangement example of an abstracted action.

Next, in the above example, since the size of the abstracted action $\rho$ is 4, as illustrated in FIG. 6, $\rho=[u_1, u_2, u_3, u_4]$ is mapped to s=[(2,2), (2,4), (4,2), (4,4)]. At this time, it is desirable to map the abstracted action $\rho$ as uniformly as possible in consideration of the distance from the other virtualized objects.

The action transformation unit 122-2 inputs four abstracted actions $\rho$ to the action transform function to calculate a score of each virtualized object. For example, the score of $O_{3,2}$ may be calculated by the following Equation 3.

$$T(o_{3,2}) = \frac{u_1}{(\|o_{i,j} - s_1\| + 1)^K} + \frac{u_2}{(\|o_{i,j} - s_2\| + 1)^K} + \frac{u_3}{(\|o_{i,j} - s_3\| + 1)^K} + \frac{u_4}{(\|o_{i,j} - s_4\| + 1)^K} \quad \text{Equation 3}$$

As described above, $o_{3,2}-s_1$ refers to a distance between $o_{3,2}$ and $S_1$. Since $s_1$ is (2,2), the distance from $O_{3,2}$ is calculated by a maximum norm (supreme norm) of two position vectors.

If in the above example, a value of $u_2$ is larger than $u_1, u_3,$ and $u_4$, objects close to $s_2$ are close to each other so that a value $$\frac{u2}{(\|O_{3,2} - s2\| + 1)^K}$$

may be larger than the other virtualized object and the score T(o) of the virtualized object may be high. That is, when $u_2$ becomes larger, a possibility of selecting the virtualized object close to $s_2$ to which $u_2$ is mapped is increased. This means that there is locality in the VOL. K represents a range of the influence of the score $u_n$ of each $s_n$. Here, the larger the K value, the larger the values of the denominator so that the influence of the abstracted action $\rho$ on the score of each virtualized object may be reduced.

In this manner, the locality aware action abstraction unit 122 assigns scores to N virtualized objects to select k virtualized objects having a higher score and may consequently select k virtualized objects from N virtualized objects using an action $\rho$ with a small size. Accordingly, the problem of the reinforcement learning of the related art in which learning speed and performance decrease as a size of the action space increases may be solved.

Hereinafter, an overall operation of the sensor data management system 100, according to an example, will be described with reference to FIG. 3.

(1) The locality aware action abstraction unit 122 receives present state information (for example, metadata information and query information) of the plurality of virtualized objects from the virtual object layer 110 in the unit of predetermined time to input the information to the reinforcement learning agent 122-1.

(2) The locality aware action abstraction unit 122 converts the abstracted action output from the reinforcement learning agent 122-1 into a score for each virtualized object using the action transform function.

(3) to (4) The resource manager 124 assigns scores to the plurality of virtualized objects based on the score calculated by the locality aware action abstraction unit 122 to update the virtualized objects having a higher priority.

(5) to (6) The resource manager 124 transmits data transmitted from the sensor network connected to a physical environment to the state manager 114 to update virtualized objects.

(7) The state manager 114 transmits a positive value when the queries requested by the application are satisfied and a negative value when the queries are violated, as a reward of the reinforcement learning agent 122-1. A rewarding method of the state manager 114 is illustrated in detail in Algorithm 1 of FIG. 7.

Figure 7:
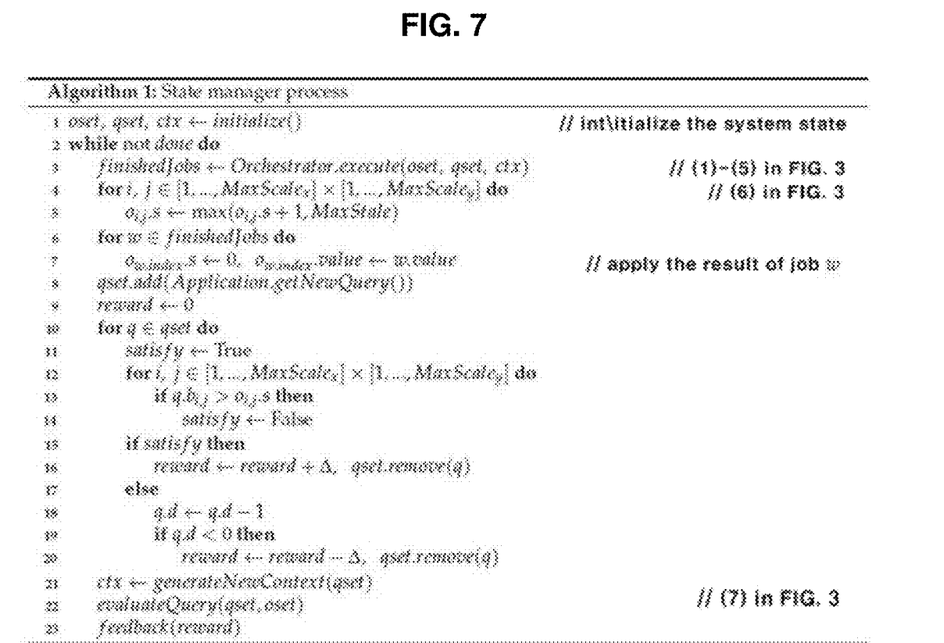
FIG. 7 is a pseudocode for an operation algorithm of a virtual object layer in a reinforcement learning-based sensor data management system, according to an embodiment.

Referring to FIG. 7, when a sensor is updated, the state manager 114 updates a value of a corresponding virtualized object and an aging degree and gets a new query from the application. Thereafter, the state manager 114 evaluates all queries which are deferred for the application and sends a reward feedback to the data orchestrator 120. In this case, the state manager 114 sends a negative feedback −Δ for a violated query and sends a positive feedback +Δ for the satisfied query (here, Δ>0). When the system state [qset; oset; ctx] is consistently updated and shared, the reinforcement learning agent 122-1 of the data orchestrator 120 uses a policy to drive an action and makes a decision for scheduling.

Figure 8:
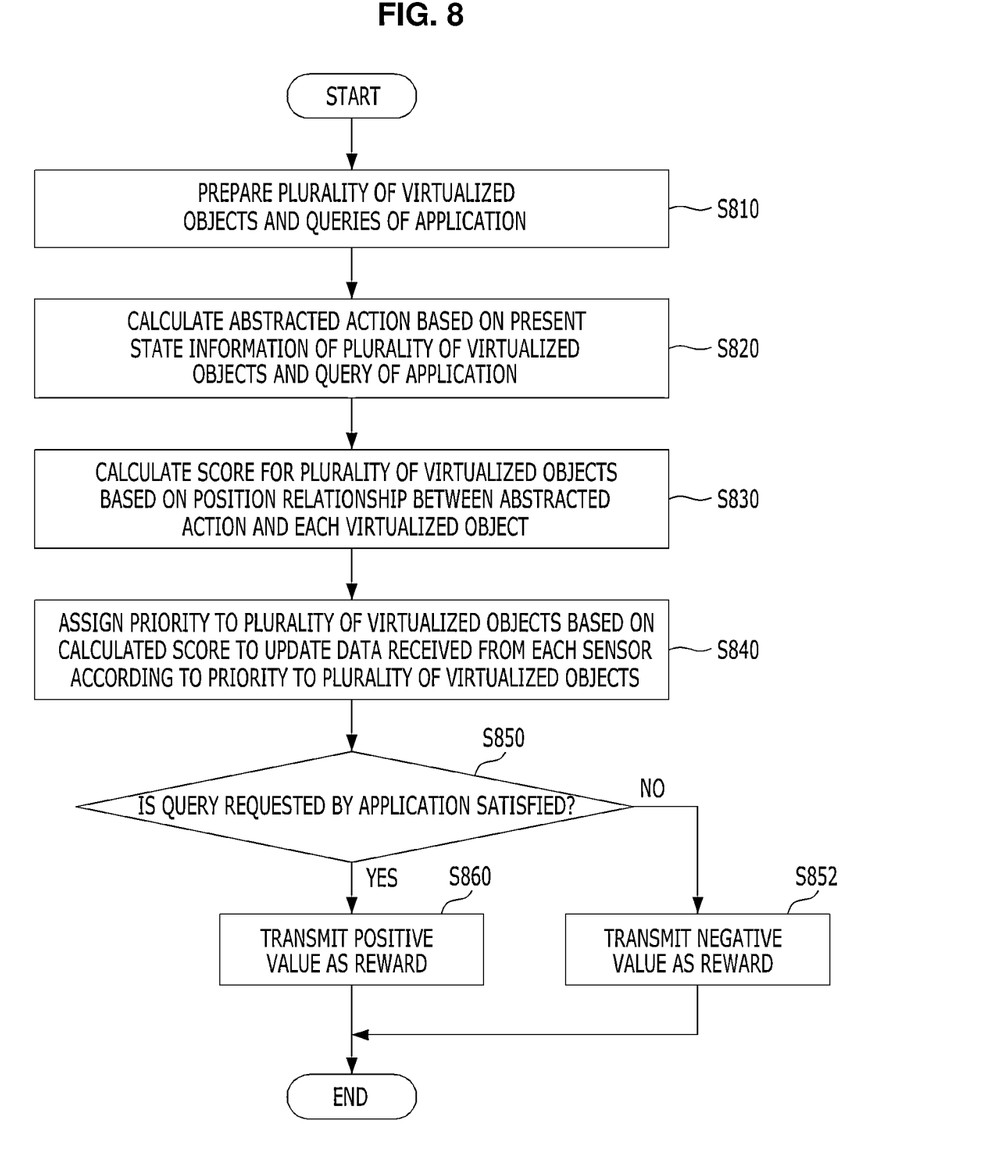
FIG. 8 is a flowchart illustrating a reinforcement learning-based sensor data management method, according to an embodiment.

FIG. 8 is a flowchart illustrating a reinforcement learning-based sensor data management method, according to an embodiment.

Referring to FIG. 8, the reinforcement learning-based sensor data management system 100 prepares a plurality of virtualized objects that corresponds to a plurality of sensors included in the sensor network to update data received from each sensor and queries representing a data quality requested by the application, in operation S810. The present state information of the plurality of virtualized objects includes an aging degree indicating a time interval between a time when the virtualized object is most recently updated and the present time, an update execution time indicating a time required to update the virtualized object after determining to update the virtualized object, and a remaining execution time indicating a time remaining until the update of the virtualized object is completed and each query of the application includes an aging degree upper limit and a deadline for each virtualized object.

The reinforcement learning-based sensor data management system 100 calculates an abstracted action which abstracts a size of an action space of a sensor network based on the present state information of the plurality of virtualized objects and the queries of the application, in operation S820. At this time, the reinforcement learning-based sensor data management system 100 calculates an abstracted action having an action space smaller than an action space of the sensor network based on a policy which is set in advance with the aging degree of each virtualized object, the update execution time, the remaining execution, the queries of the application, and contexts as inputs.

The reinforcement learning-based sensor data management system 100 calculates scores for the plurality of virtualized objects based on the position relation between the calculated abstracted action and each virtualized object, in operation S830. At this time, the reinforcement learning-based sensor data management system 100 calculates scores for the plurality of virtualized objects based on a distance between the calculated abstracted action and each virtualized object.

The reinforcement learning-based sensor data management system 100 assigns priorities to the plurality of virtualized objects based on the calculated score to update data received from each sensor to the plurality of virtualized objects according to the priority, in operation S840.

The reinforcement learning-based sensor data management system 100 determines whether the queries requested by the application are satisfied in operation S850 and, if the query is satisfied, transmits a positive value as a reward in operation S860. If the query is violated, the reinforcement learning-based sensor data management system 100 transmits a negative value as a reward in operation S852. For example, when the aging degree of all virtualized objects is lower than an aging degree upper limit of the corresponding query and the deadline of the query does not end, the reinforcement learning-based sensor data management system 100 determines that the corresponding query is satisfied. In contrast, when the deadline of the query has elapsed, the reinforcement learning-based sensor data management system 100 determines that the query is violated.

Figure 9:
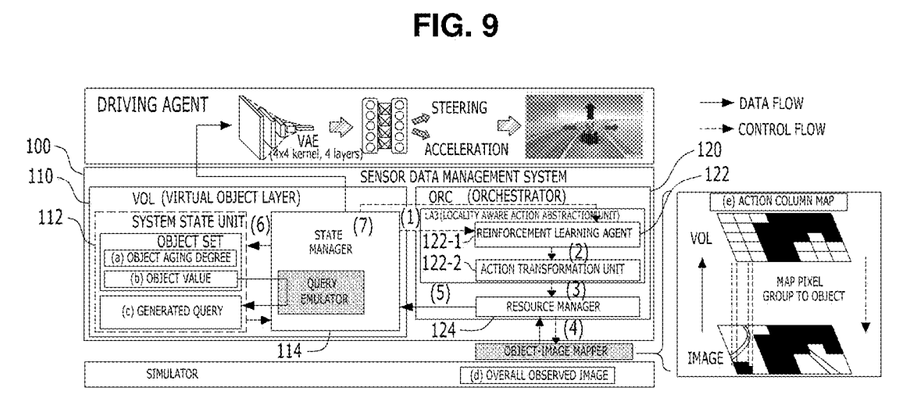
FIG. 9 is a view illustrating a structure of a simulation for performance evaluation, according to an example.

FIG. 9 is a view illustrating a structure of a simulation for performance evaluation, according to an example.

FIG. 9 shows an overall system environment in which the reinforcement learning-based sensor data management system 100 serves as an arbiter between a driving agent and a game environment (simulator). The reinforcement learning-based sensor data management system 100 provides a data layer which controls and transmits data update to the driving agent from the game environment.

As an image pixel in a single group is sensed by an individual sensor, as well as a general unified structure of a framework, an object-image mapper in which an image pixel group corresponds to a virtualized object of the VOL is implemented. This design is to emulate an application with a plurality of sensors. Even though the simulator itself does not assume details for an image sensing mechanism, it is assumed that a plurality of camera sensors is mounted in a vehicle.

At each time step, the data orchestrator 120 may selectively schedule to update the virtualized object under a specific resource constraint, in the same manner described above.

Figure 10:
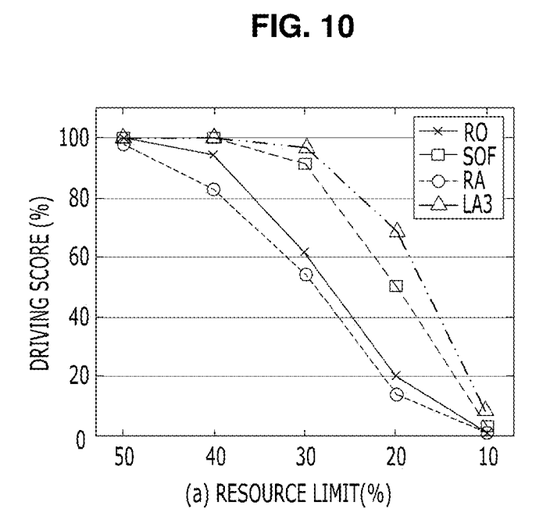
FIG. 10 is a graph illustrating a result of a simulation of FIG. 9.

FIG. 10 is a graph illustrating a result of a simulation of FIG. 9.

In order to evaluate the simulation of FIG. 9 above, the locality aware action abstraction unit LA3 is compared with non-real life (non-RL) heuristics such as stalest object first (SOF) and random action (RA) and another reference random object (RO). RO arbitrarily performs an action for every object at each time step without embedding any action. This is different from RA in that any action transform function is not used. At this time, since the deadline of all queries q.d which are internally generated is set to 1, earliest deadline first (EDF) is excluded from the reference.

First, in various resource constraints, a simulator was tested with the reinforcement learning-based sensor data management system 100. FIG. 10 shows a normalized driving score for a resource limit (X-axis). As illustrated in the drawing, in most cases, LA3 shows higher performance than the others and shows a performance 18.3% higher than that of SOF under the limit of 20%. It is more important that LA3 maintains 96.2% of a driving score even in 30% limit as compared with the 100% of proposed performance. This simulator result shows that the driving agent may be stably driven in a driving environment having a high limit by means of the LA3. For example, in the VOL, only 30% of sensor data update is selectively applied and 70% is suppressed to reduce a bandwidth.

In this simulation test, an RL-based driving agent which consistently gets a driving scene image as an input state is used to make a decision related to steering and acceleration. In the original simulation setting, in some cases, a delayed decision is caused in a high resolution input, which lowers the driving score. However, the data orchestrator 120 of the reinforcement learning-based sensor data management system 100 provides an excellent data quality to the driving agent while managing an input that consumes a small amount of resources. By doing this, the driving agent may acquire a higher score. As a result, the RL-based data management is used to achieve the stability without using precise function engineering or image processing.

The reinforcement learning-based sensor data management system 100, the VOL 110, the system state unit 112, the state manager 114, the ORC 120, the (LA3) 122, the reinforcement learning agent 122-1, the action transformation unit 122-2, the resource manager 124, the processors, and the memories in FIGS. 1A to 10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A to 10 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

In the above-described example system, although the methods have been described based on a flowchart as a series of steps or blocks, the disclosure herein is not limited to the order of the steps and some steps may be generated in a different order from the above-described step or simultaneously. Further, the steps shown in the flowchart are not exclusive, but another step may be included and one or more steps of the flowchart may be omitted without affecting the scope of the disclosure.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A reinforcement learning-based sensor data management system, comprising:
a processor configured to:
manage virtualized objects that correspond to sensors included in a sensor network to update data received from each of the sensors and queries representing a data quality requested by an application;
calculate an abstracted action that abstracts a size of an action space of the sensor network based on present state information of the virtualized objects and the queries;
calculate scores for virtualized objects based on position relationships between the calculated abstracted action the virtualized objects; and
assign priorities to the virtualized objects based on the calculated scores to update data received from the sensors to the virtualized objects according to the priorities,
wherein the present state information includes aging degrees indicating time intervals between times at which the virtualized objects are most recently updated and a present time, update execution times indicating times required to update the virtualized objects after determining to update the virtualized objects, and remaining execution times indicating times remaining until updates of the virtualized object are completed, and
wherein the queries include aging degree upper limits and deadlines for the virtualized objects.

2. The reinforcement learning-based sensor data management system according to claim 1, wherein the processor comprises:
a virtual object layer configured to manage the virtualized objects; and
a data orchestrator configured to calculate the abstracted action, calculate the scores for virtualized objects, and assign the priorities to the virtualized objects.

3. The reinforcement learning-based sensor data management system according to claim 2, wherein the data orchestrator is further configured to calculate the abstracted action having an action space smaller than an action space of the sensor network, based on a policy that is set in advance with the aging degrees of the virtualized objects, the update execution times, the remaining execution times, the queries, and contexts as inputs.

4. The reinforcement learning-based sensor data management system according to claim 2, wherein the data orchestrator is further configured to calculate the scores for the virtualized object based on distances between the abstracted action and the virtualized objects.

5. The reinforcement learning-based sensor data management system according to claim 1, wherein the processor is further configured to:
transmit a positive value as a reward, in response to the queries being satisfied; and
transmit a negative value as the reward, in response to the queries being violated.

6. A processor-implemented method for reinforcement learning-based sensor data management, the method comprising:
preparing, by a reinforcement learning-based sensor data management system, virtualized objects that correspond to sensors included in a sensor network to update data received from each of the sensors and queries representing a data quality requested by an application;
calculating, by the reinforcement learning-based sensor data management system, an abstracted action that abstracts a size of an action space of the sensor network based on present state information of the virtualized objects and the queries;
calculating, by the reinforcement learning-based sensor data management system, scores for the virtualized objects based on position relationships between the calculated abstracted action and the virtualized objects; and
assigning, by the reinforcement learning-based sensor data management system, priorities to the virtualized objects based on the calculated scores to update data received from the sensors to the virtualized objects according to the priorities,
wherein the present state information of the virtualized objects includes aging degrees indicating time intervals between times at which the virtualized objects are most recently updated and a present time, update execution times indicating times required to update the virtualized objects after determining to update the virtualized objects, and remaining execution times indicating times remaining until updates of the virtualized objects are completed, and
wherein the queries include aging degree upper limits and a deadlines for the virtualized objects.

7. The method according to claim 6, wherein, in the calculating of the abstracted action, the reinforcement learning-based sensor data management system calculates the abstracted action having an action space smaller than an action space of the sensor network, based on a policy that is set in advance with the aging degrees of the virtualized objects, the update execution times, the remaining execution times, the queries, and contexts as inputs.

8. The method according to claim 6, wherein in the calculating of the scores, the reinforcement learning-based sensor data management system calculates scores for the virtualized objects based on distances between the abstracted action and the virtualized objects.

9. The method according to claim 6, further comprising:
transmitting, by the reinforcement learning-based sensor data management system, a positive value as a reward in response to the queries being satisfied; and transmitting, by the reinforcement learning-based sensor data management system, a negative value as the reward in response to the queries being violated.

10. A non-transitory computer-readable storage medium storing instructions that, when executed by a processor, cause the processor to perform the method of claim 6.

* * * * *